(12) United States Patent
Chinya et al.

(10) Patent No.: US 11,714,977 B2
(45) Date of Patent: Aug. 1, 2023

(54) MULTIPLICATION-FREE APPROXIMATION FOR NEURAL NETWORKS AND SPARSE CODING

(71) Applicant: Intel Corporation, Santa Clara, CA (US)

(72) Inventors: Gautham Chinya, Sunnyvale, CA (US); Shihao Ji, Portland, OR (US); Arnab Paul, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/554,255

(22) Filed: Dec. 17, 2021

(65) Prior Publication Data

US 2022/0108093 A1 Apr. 7, 2022

Related U.S. Application Data

(62) Division of application No. 17/067,979, filed on Oct. 12, 2020, now Pat. No. 11,232,273, which is a
(Continued)

(51) Int. Cl.
*G06K 7/10* (2006.01)
*G06N 20/10* (2019.01)
(Continued)

(52) U.S. Cl.
CPC .......... *G06K 7/10722* (2013.01); *G06F 7/483* (2013.01); *G06F 7/487* (2013.01);
(Continued)

(58) Field of Classification Search
CPC .. G06K 7/10722; G06K 7/1413; G06F 7/483; G06F 7/487; G06F 17/16;
(Continued)

(56) References Cited

U.S. PATENT DOCUMENTS 10,867,142 B2 12/2020 Chinya et al.
2005/0187975 A1 8/2005 Yamane
(Continued)

FOREIGN PATENT DOCUMENTS

WO 2006-106508 A2 10/2006

OTHER PUBLICATIONS

I. Rodonaia and V. Rodonaia, "Application of geometrical algebra to neural computations," 2012 6th International Conference on Application of Information and Communication Technologies (AICT), 2012, pp. 1-4, doi: 10.1109/ICAICT.2012.6398473. (Year: 2012).*
(Continued)

*Primary Examiner* — Matthew Mikels
(74) *Attorney, Agent, or Firm* — Jordan IP Law, LLC

(57) ABSTRACT

Systems, apparatuses and methods may provide for replacing floating point matrix multiplication operations with an approximation algorithm or computation in applications that involve sparse codes and neural networks. The system may replace floating point matrix multiplication operations in sparse code applications and neural network applications with an approximation computation that applies an equivalent number of addition and/or subtraction operations.

6 Claims, 9 Drawing Sheets

Related U.S. Application Data division of application No. 16/306,736, filed as application No. PCT/US2016/039977 on Jun. 29, 2016, now Pat. No. 10,867,142.

(51) Int. Cl.
    *G06F 7/487*     (2006.01)
    *G06F 7/483*     (2006.01)
    *G06N 3/045*     (2023.01)
    *G06F 17/16*     (2006.01)
    *G06K 7/14*     (2006.01)
    *G06N 3/04*     (2023.01)

(52) U.S. Cl.
    CPC ........... *G06F 17/16* (2013.01); *G06K 7/1413* (2013.01); *G06N 3/04* (2013.01); *G06N 3/045* (2023.01); *G06N 20/10* (2019.01); *G06F 2207/4824* (2013.01)

(58) Field of Classification Search
    CPC .............. G06F 2207/4824; G06N 3/04; G06N 3/0454; G06N 20/10
    See application file for complete search history.

(56) References Cited

U.S. PATENT DOCUMENTS

| | | |
|---|---|---|
| 2009/0271433 A1 | 10/2009 | Perronnin et al. |
| 2011/0298788 A1 | 12/2011 | Hickey et al. |
| 2012/0023051 A1 | 1/2012 | Pishehvar et al. |
| 2014/0161355 A1 | 6/2014 | Wang et al. |
| 2016/0005183 A1 | 1/2016 | Thiagarajan et al. |
| 2016/0328643 A1 | 11/2016 | Liu et al. |
| 2017/0083752 A1 | 3/2017 | Saberian et al. |

OTHER PUBLICATIONS

G. Karabulut, A. Yongaçoğlu and T. Kurt, "Adaptive resolution by matching pursuit algorithms," 2005 13th European Signal Processing Conference, 2005, pp. 1-4. (Year: 2005).*

Dourbal, "Synthesis of fast multiplication algorithms for arbitrary tensors", https://doi.org/10.48550/arXiv.1602.07008 (Year: 2016).*

International Search Report and Written Opinion for International Patent Application No. PCT/US2016/039977, dated Feb. 17, 2017, 10 pages.

Behan et al., "Integer Neural Networks On Embedded Systems", Recent Advances in Technologies, ISBN: 978-953-307-017-9, Nov. 1, 2009, pp. 81-94, InTech, Rijeka, Croatia.

Lin et al., "Neural Networks with Few Multiplications", Article, Oct. 11, 2015, 7 pages.

Akbas et al., "Multiplication-Free Neural Networks", 2015 23nd Signal Processing and Communications Applications Conference (SIU), May 2015,3 pages including English Abstract only, Malatya, Turkey.

International Preliminary Report on Patentability for International Patent Application No. PCT/US2016/039977, dated Jan. 10, 2019, 7 pages.

Non-Final Office Action for U.S. Appl. No. 16/306,736, dated Oct. 22, 2019, 8 pages.

Ex-Parte Quayle Action for U.S. Appl. No. 16/306,736, dated Mar. 16, 2020, 4 pages.

Notice of Allowance for U.S. Appl. No. 16/306,736, dated Aug. 18, 2020, 7 pages.

Non-Final Office Action for U.S. Appl. No. 17/067,979, dated May 5, 2021, 8 pages.

Notice of Allowance for U.S. Appl. No. 17/067,979, dated Sep. 17, 2021, 8 pages.

\* cited by examiner

MULTIPLICATION-FREE APPROXIMATION FOR NEURAL NETWORKS AND SPARSE CODING

CROSS-REFERENCE TO RELATED APPLICATIONS

This application is a Divisional Patent Application which claims the benefit of priority to Divisional patent application Ser. No. 17/067,979 filed Oct. 12, 2020, which claims the benefit of priority to U.S. National Phase Patent application Ser. No. 16/306,736 filed Dec. 3, 2018, which claims the benefit of priority to International Patent Application No. PCT/US2016/039977 filed on Jun. 29, 2016.

BACKGROUND

Technical Field

Embodiments generally relate to sparse codes and neural networks. More particularly, the embodiments relate to a system that replaces floating point matrix multiplication operations in sparse code applications and neural network applications with an approximation computation that applies an equivalent number of addition and/or subtraction operations.

Discussion

Floating point matrix multiplication is at the core of virtually all machine-learning applications including neural networks and sparse-coding. A given matrix multiplication operation "O" may involve $O(n^3)$ floating-point multiplication steps, wherein a simple multiplier circuit may take a relatively long time to carry out one multiplication operation compared to one adder circuit. For example, in C++, one million addition operations may take 18 milliseconds, while one million multiplication operations may take 25 milliseconds. On the other hand, an advanced multiplier, such as a one-cycle multiplier, which may be as fast as an addition operation, typically consumes significantly more power. On a mobile or hand-held device, the result may be a substantial trade-off between power and speed.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION OF EXEMPLARY EMBODIMENTS

Figure 1:
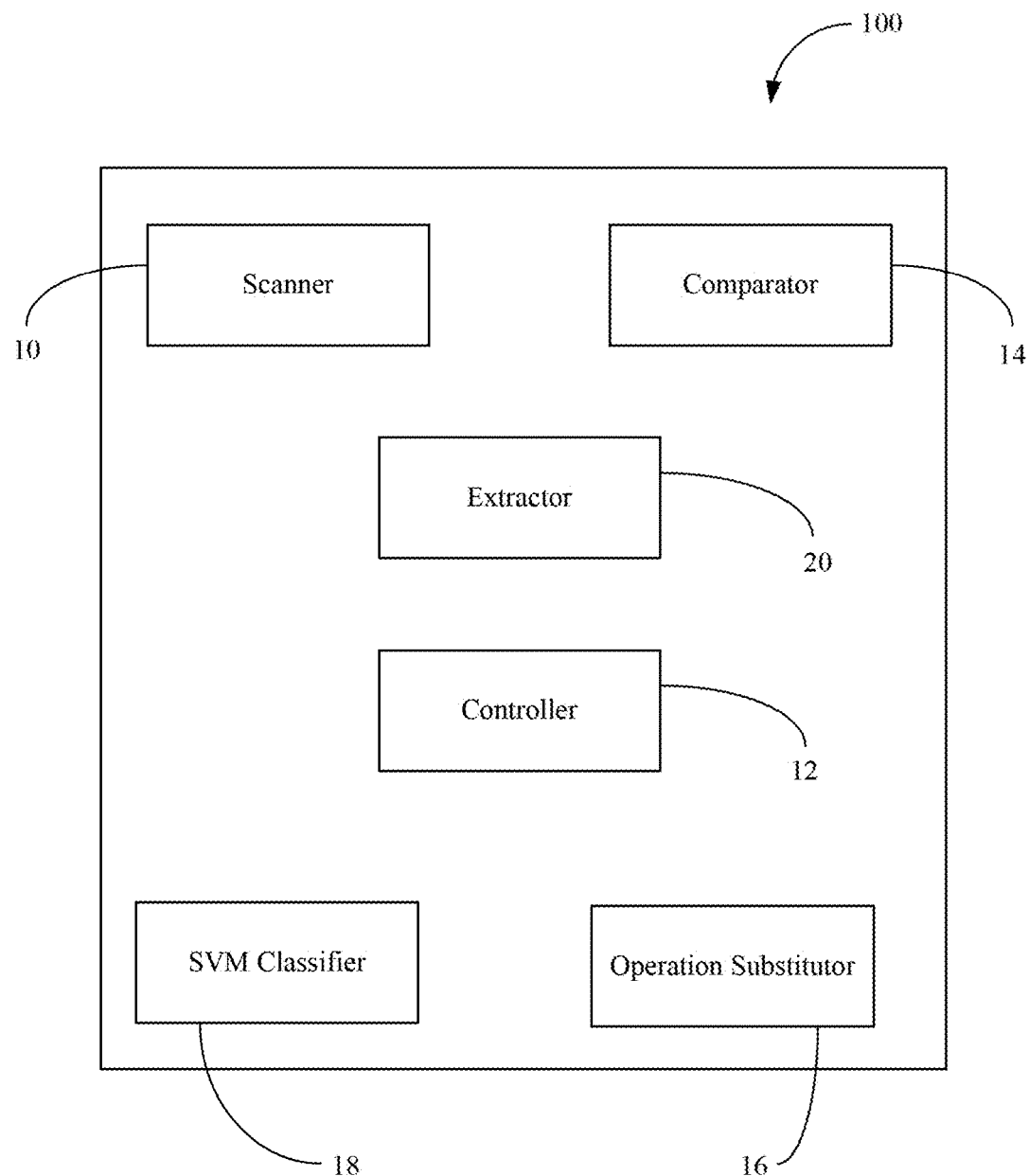
FIG. 1 is a block diagram of an example of a system to replace floating point matrix multiplication operations with an approximation algorithm in sparse code and neural network applications according to an embodiment.

Turning now to FIG. 1, a system 100 that replaces floating point matrix-multiplication operations with an equivalent number of addition and or subtraction operations is shown. The illustrated system 100 includes a scanner 10, a controller 12, a comparator 14, an operation substitutor 16, a support vector machine (SVM) classifier 18, and an extractor 20 to extract sparse codes from a scanned external image. The scanner 10 may be a three-dimensional (3D) bar code scanner/reader, a 3D camera, and so forth. The 3D camera may be, for example, a dedicated, stand-alone unit, or may be incorporated into another device such as a smart phone, tablet computer, notebook computer, tablet computer, convertible tablet, personal digital assistant (PDA), mobile Internet device (MID), wearable computer, desktop computer, camcorder, video recorder, media player, smart television (TV), gaming console, etc., or any combination thereof.

In the illustrated example, the scanner 10 may operate under the direction of the controller 12 in order to send captured data to the comparator 14. Specifically, the system 100 may include logic to execute a command from the controller 12 to control the scanner 10 to scan an external image. The external image may be, for example, a barcode image that is attached to an item on the shelf of a store. However, the external image is not limited thereto. Sparse codes may be extracted from the scanned external image, and at least two unit vectors may be obtained from the scanned image. A similarity between the two unit vectors may be determined based on one or more matrix-vector multiplication operations executed on the two unit vectors, and the one or more matrix-vector multiplication operations executed on the two unit vectors may be replaced by the operation substitutor 16 with an approximation computation comprising one or more addition and/or subtraction operations.

For sparse-coding applications, the approximation computation may replace the matrix multiplication step forming the core of matching-pursuit (MP) or orthogonal matching-pursuit (OMP) type algorithms, and may still yield sparse-codes that are quite similar to baseline algorithms. As a result, a support vector machine (SVM) classifier 18, working over the space of sparse-codes may incur little or no loss in classification accuracy.

The approximation computation would now be discussed with regard to the following observations.

First, the inner product of two unit vectors maintains an inverse relationship with their $l_2$ distance. For example, if two unit vectors are a and b, the $l_2$ distance between the unit vectors may be given by the operation:

$$(a-b)^T(a-b) = a^T a + b^T b - 2a^T b = 2 - 2a^T b \text{ (since they are unit vectors, } a^T a = b^T b = 1\text{).}$$

Figure 2:
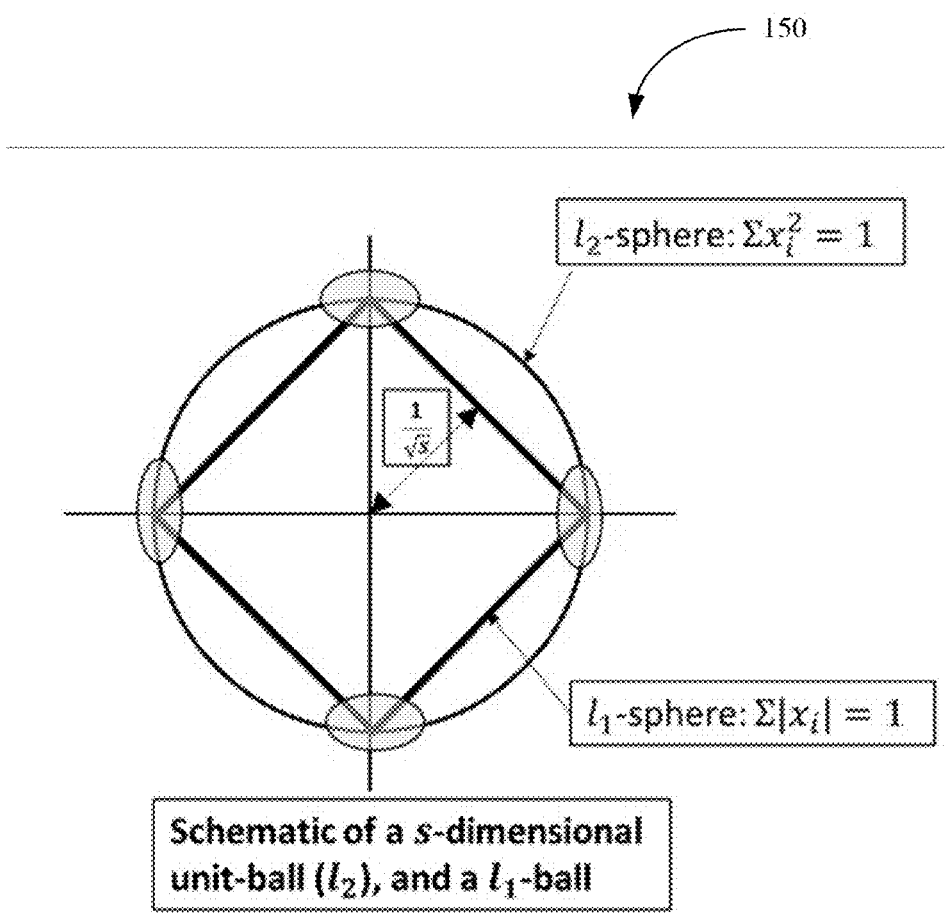
FIG. 2 is an illustration of an example of $l_1$ and $l_2$ norms according to an embodiment.

Second, and with regard to FIG. 2, an illustration 150 demonstrates that the $l_2$ norm of any unit vector may be approximated by its $l_1$ norm near the regions where the $l_1$ sphere and the $l_2$ sphere touch each other. A worst case approximation error may be given by the relation $(1-1/\sqrt{s})$, where s is the number of non-zero components (sparsity), indicating that for highly sparse signals, the approximation error does not grow too quickly.

The methods in accordance with the exemplary embodiment revolve around a generic distance computation in mathematics, known as the $l_p$ distance. For example, let a and b be two vectors:

$$a=(a_1, a_2, \ldots a_n)$$

$$b=(b_1, b_2, \ldots b_n)$$

The $l_p$ distance between the vectors may be given by the relation:

$$|a-b|_p = (|a_1-b_1|^p + |a_2-b_2|^p + \ldots + |a_n-b_n|^p)^{1/p}$$

For p=2, the standard distance, (also obtained via the Pythagorus' theorem), commonly known as the $l_2$ distance, may be obtained. Similarly, for p=1, the $l_1$ distance, which is also known as the Manhattan distance. $l_1$ may be obtained. The $l_1$ distance is special in the sense that it does not involve computing any multiplication, but involves only addition, subtraction, and checking the sign bit of numbers.

Based on the above observations, the inner product of two vectors, (which forms the inner core of matrix multiplication), is replaced by a quantity that is dependent on their $l_1$ distance, i.e., $$a^T b = 2 - |a-b|_2^2 \approx 2 - |a-b|_1^2$$

Note that the $l_1$ distance $|a-b|_1 = \Sigma_i |a_i - b_i|$ gives a multiplication-free approximation.

Figure 3:
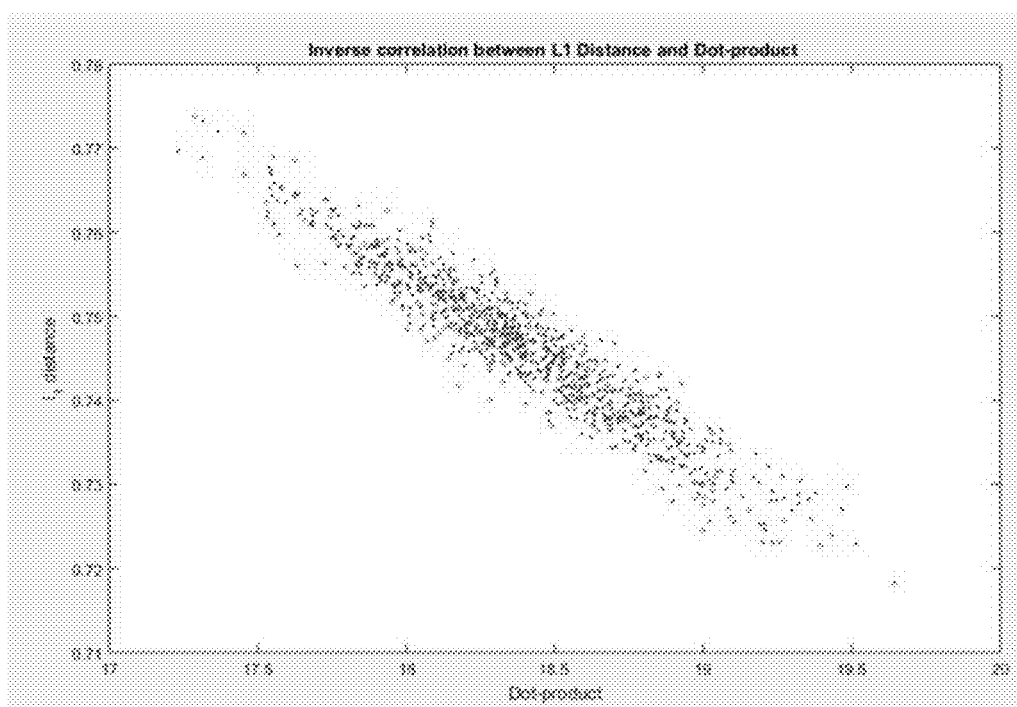
FIG. 3 is an illustration of an example of the correlation between b distances and the dot product between two unit vectors.

Turning now to FIG. 3, a correlation 300 between the dot products and the $l_1$ distances between two unit vectors is illustrated. There is a strong inverse correlation between the $l_2$ distances and the dot products between two unit vectors. In FIG. 3, two 1000-dimensional unit vectors may be randomly chosen and plotted as a dot on the coordinates marked by the $l_1$ distances (the y-axis), and the inner product of the unit vectors (the X-axis).

An approximation algorithm or computation may then be generated. In one example, a Pick-Best-Matching-Vector (PBMV) operation takes as an input a set of basis vectors (such as neurons with weights, or dictionary atoms for sparse codes arranged as the columns of a matrix W, as well as an input vector x, and outputs a best matching neuron, (with respect to neural network applications), or a best matching atom, (with respect to sparse code applications) that corresponds to the inputted set of basis vectors. In other words, the PBMV outputs a column-index i, such that $w_i^T x > w_j^T x$ for $i \neq j$. $W_i$ refers to the $i^{th}$ column of the matrix W. The PBMV computation is normally where the vector multiplication takes place. The multiplication step is replaced with the approximation computation. Specifically, for each column j, the relation $\delta j = |wj - x|_1$, and an index t is returned, such that $\delta_t$ is the minimum. Computing the best matching vector in this manner avoids any multiplication operations with regard to the inner product of the unit vectors. Moreover, any errors that occur by substituting the inner product with the approximation computation may be negligible.

Figure 4:
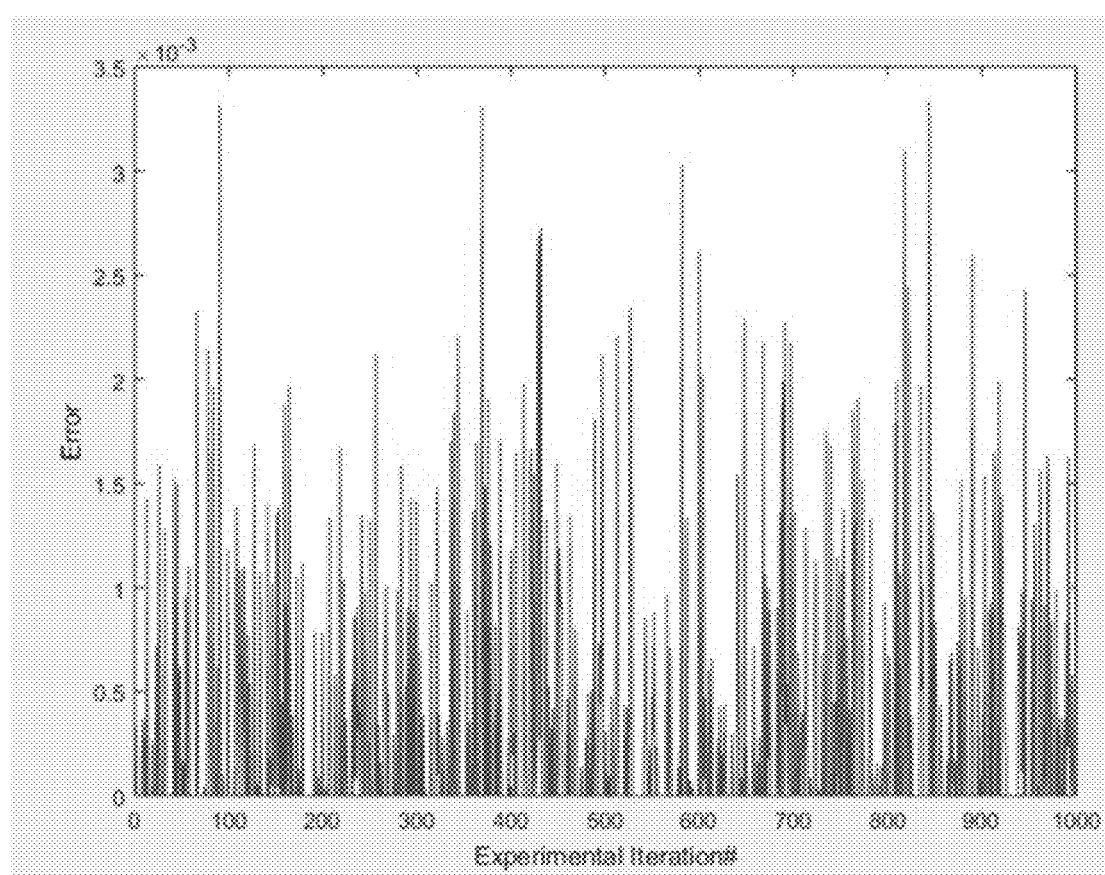
FIG. 4 is a graph illustrating an example of errors incurred over multiple experimental iterations with respect to randomly chosen dictionary atoms according to an embodiment.

Turning to FIG. 4, a graph 400 illustrates errors that incurred over approximately one thousand experimental iterations over 100 randomly chosen dictionary atoms, each of which is a 10,000 dimensional unit vector. The error is measured by the relation $\in = x^T (w_{dp} - w_{PBMV})$, where $w_{dp}$ is the matrix that would have been picked up by the multiplication-based dot products, and $w_{PBMV}$ is the vector picked up by the approximation computation.

Figure 5:
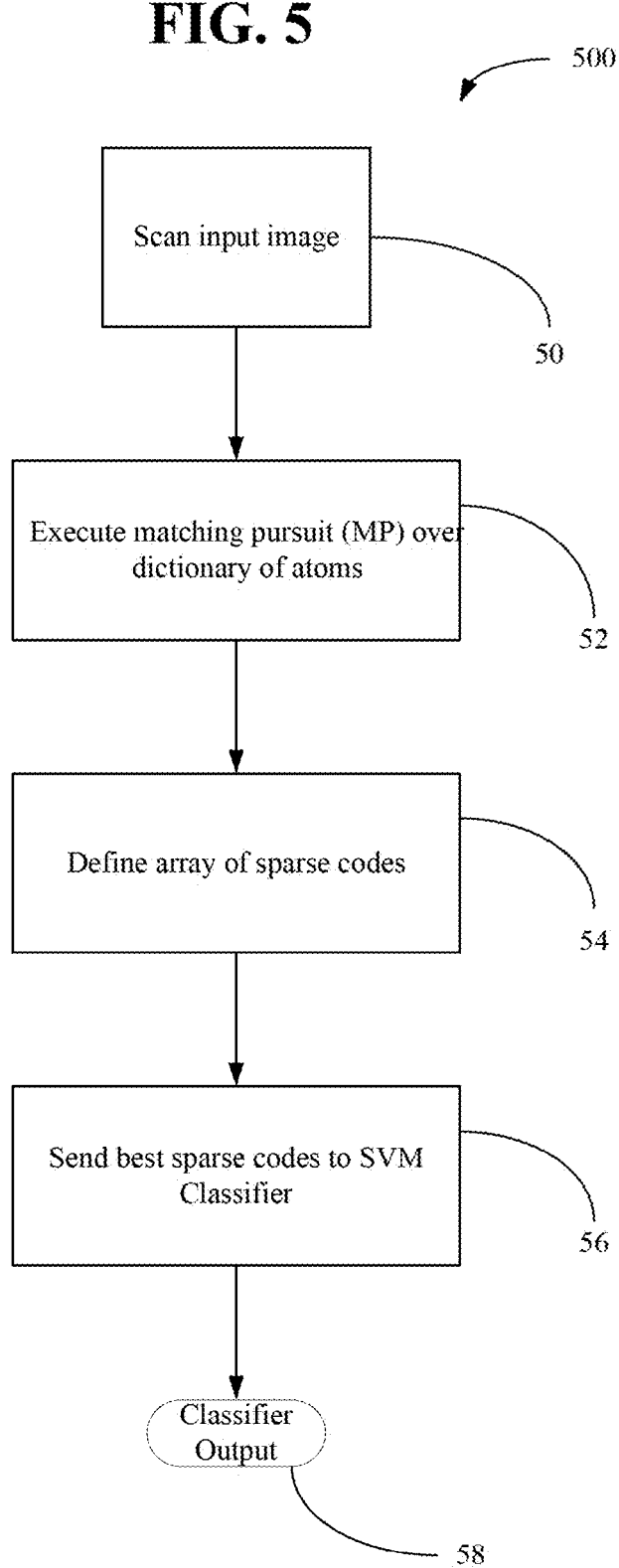
FIG. 5 is a flow chart of an example of a method of an approximation computation according to an embodiment.

Turning now to FIG. 5, a method 500 of replacing the dot product of two unit vectors with an approximation computation in sparse code applications is illustrated. The method 500 may generally be implemented in a device such as, for example, a smart phone, tablet computer, notebook computer, tablet computer, convertible tablet, PDA, MID, wearable computer, desktop computer, camcorder, video recorder, media player, smart TV, gaming console, etc., already discussed. More particularly, the method 500 may be implemented as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 500 may be written in any combination of one or more programming languages, including an object oriented programming language such as JAVA, SMALLTALK, C++ or the like and conventional procedural programming languages, such as the "C" programming language or similar programming languages.

The illustrated method begins at processing block 50, where an image, for example, a barcode attached to an item on the shelf of a store, is scanned by a scanning device such as, for example, the system 100 (FIG. 1). The captured image may be transmitted to an external server (not shown) for classification computation. Alternatively, the scanned image may be stored in another external apparatus, wherein the classification computation may be conducted by the external apparatus.

At illustrated processing block 52, a matching pursuit (MP) orthogonal matching pursuit (OMP) algorithm may be executed on the received scanned image to compute the best sparse codes (e.g., the fewest set of feature vectors with required coefficients that can best describe the input vector). A dictionary of feature vectors may be stored in the external server or within the external apparatus itself, and the input vector may be compared to dictionary of feature vectors to compute the best sparse codes. The best sparse codes may then be defined as an array of sparse codes at processing block 54.

At illustrated processing block 56, the computed best sparse codes are then sent to a Support Vector Machine (SVM) classifier such as, for example, the SVM classifier 18 (FIG. 1) that is pre-trained based on the sparse codes of training samples. The SVM classifier (FIG. 1) classifies the input image into one of the pre-trained classes, and the selected pre-trained class is output at processing block 58.

Figure 6:
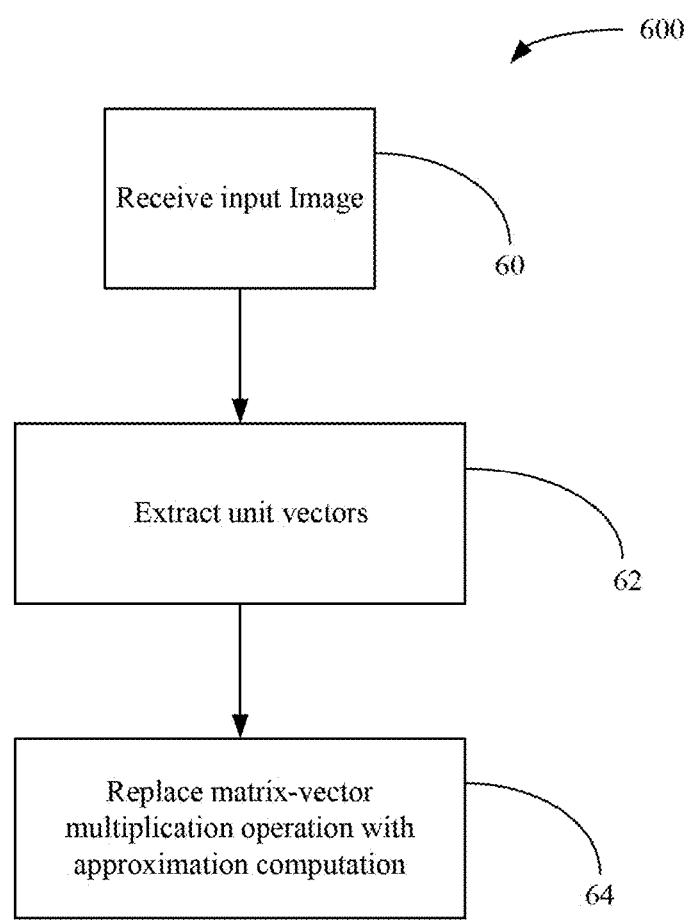
FIG. 6 is a flow chart of another example of a method of an approximation computation according to an embodiment.

Turning now to FIG. 6, another method 600 of replacing the dot product of two unit vectors with an approximation computation in sparse code applications is shown. The method 600 may generally be implemented in a device such as, for example, a smart phone, tablet computer, notebook computer, tablet computer, convertible tablet, PDA, MID, wearable computer, desktop computer, camcorder, video recorder, media player, smart TV, gaming console, etc., already discussed. More particularly, the method 600 may be implemented as a set of logic instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 600 may be written in any combination of one or more programming languages, including an object oriented programming language such as JAVA, SMALLTALK, C++ or the like and conventional procedural programming languages, such as the ""C"" programming language or similar programming languages.

The illustrated method begins at processing block 60, where an input image is received at an SVM classifier (FIG. 1). Unit vectors may be extracted from the input image at processing block 62, and a similarity between two unit vectors may be determined based on one or more matrix-vector multiplication operations executed on the two unit vectors.

At processing block 64, one or more matrix-vector multiplication operations executed on the two unit vectors may be replaced with an approximation computation.

Figure 7:
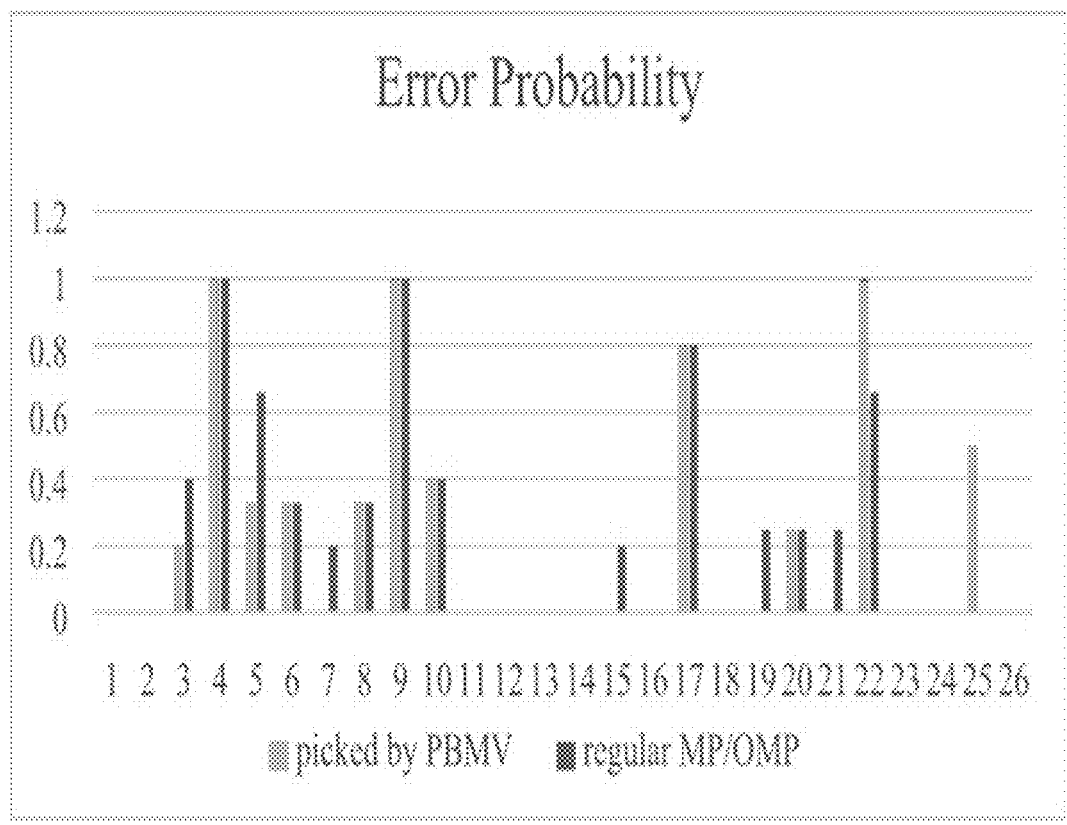
FIG. 7 is an illustration of an example of the comparison of classification errors between the approximation computation and a baseline according to an embodiment.

Turning now to FIG. 7, a graph 700 illustrates that there may be no significant drop in the classification errors when the approximation computation is compared to the baseline. In the illustrated example, there is no degradation of classification errors over samples of 25 classes that the SVM classifier uses.

With respect to the application of the embodiment to neural networks, a convolution step, which is essentially a matrix-vector multiplication step, is replaced by approximating each sub-step of the convolution operation with the following relation:

$$f_{x_a}^T \approx C - |f - x_a|_1,$$

Where f is a convolutional filter, $x_a$ is the sub-region of the vector x defined by the convolution-window a. In the above expression, C is a constant chosen empirically. Preferably, C should not be too large to erase the variation effect of the $l_1$ distance, and it should not be too small for the $l_1$ distance to dominate completely, since that would promote vectors with larger norms over those of small norms. Note that inside the neural network, the vectors are no longer guaranteed to remain unit-norm.

Figure 8:
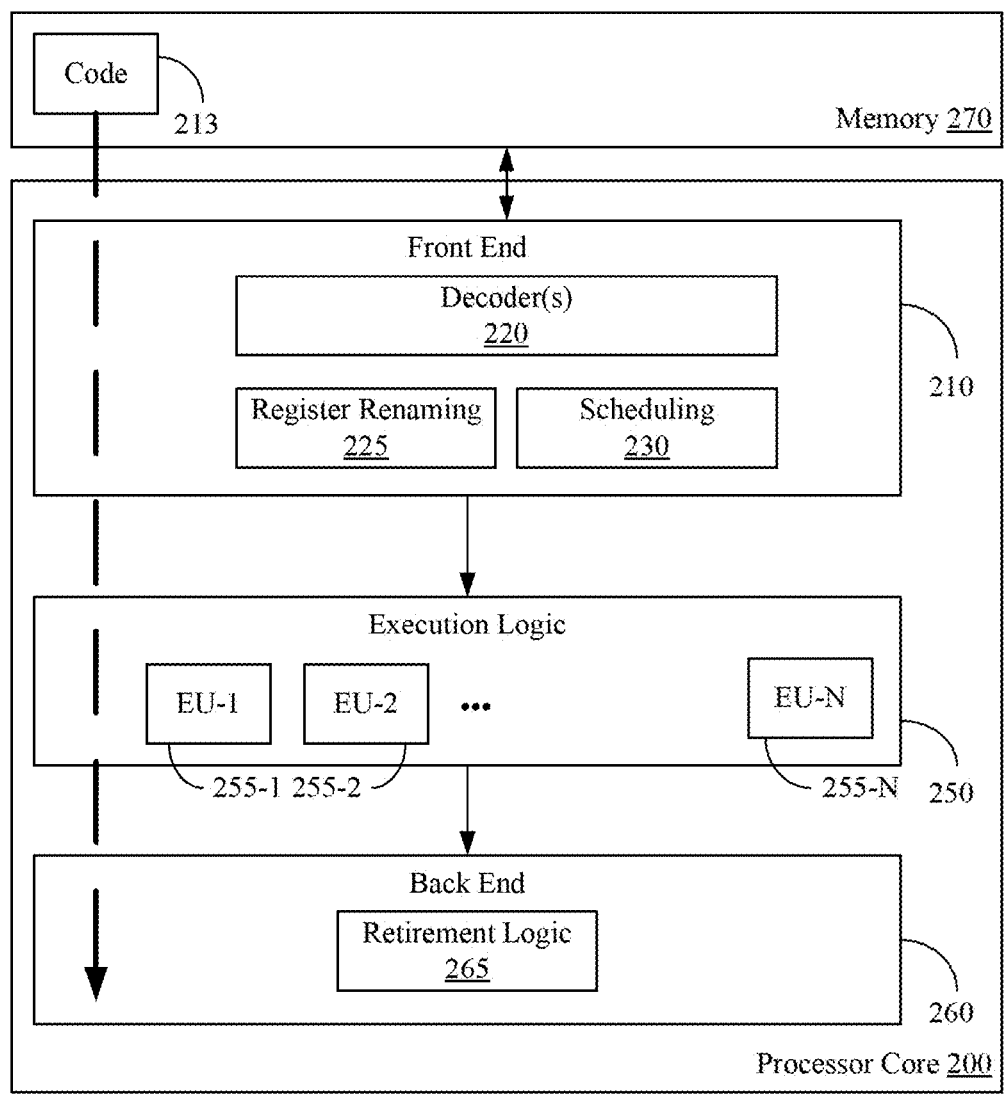
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 500 (FIG. 5), or the method 600 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
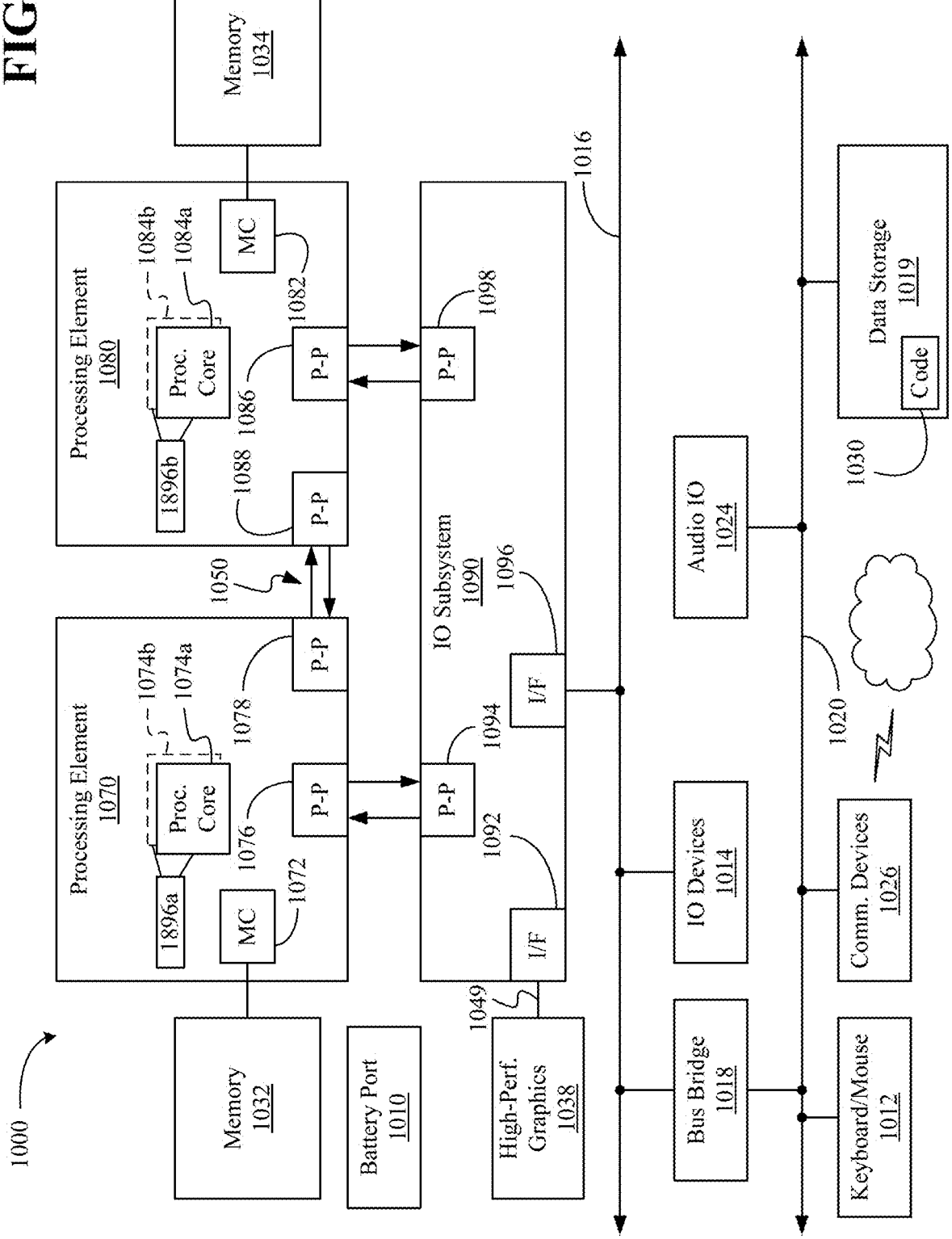
FIG. 9 is a block diagram of an example of a computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache

1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 500 (FIG. 5), or the method 600 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include a scanner-based system comprising a scanner, a controller to cause the scanner to scan an external image, an extractor to extract sparse codes from the scanned external image, a comparator to determine a similarity between two unit vectors from the scanned external image based on one or more matrix-vector multiplication operations executed on the two unit vectors, and an operation substitutor to replace the one or more matrix-vector multiplication operations executed on the two unit vectors with an approximation computation.

Example 2 may include the system of example 1, wherein the one or more matrix-vector multiplication operations executed on the two unit vectors are replaced with the approximation computation in the sparse code applications and the neural network applications.

Example 3 may include the system of example 2, wherein the approximation computation uses a set of basis vectors as an input, and outputs a best-matching neuron of the neural network applications, or a dictionary atom for the sparse code application that best corresponds to the input basis vectors.

Example 4 may include the system of example 3, wherein a matching pursuit (MP) orthogonal matching pursuit (OMP) computation is executed to compute the sparse codes.

Example 5 may include the system of example 2, wherein the matrix-vector multiplication operation is to be replaced with a convolutional filter computation that is a function of a constant and a sub-region of a vector.

Example 6 may include the system of any one of examples 1 to 5, further comprising logic to replace the one or more matrix-vector multiplication operations by an equivalent number of addition or subtraction operations.

Example 7 may include an operation replacement apparatus comprising a comparator to determine a similarity between two unit vectors based on one or more matrix-vector multiplication operations executed on the two unit vectors, and an operation substitutor to replace the one or more matrix-vector multiplication operations executed on the two unit vectors with an approximation computation.

Example 8 may include the apparatus of example 7, wherein the one or more matrix-vector multiplication operations executed on the two unit vectors are to be replaced with the approximation computation in the sparse code applications and the neural network applications.

Example 9 may include the apparatus of example 8, wherein the approximation computation is to use a set of basis vectors as an input, and output one or more of a best-matching neuron of the neural network applications or a dictionary atom for the sparse code application that best corresponds to the input basis vectors.

Example 10 may include the apparatus of example 9, wherein a matching pursuit (MP) orthogonal matching pursuit (OMP) computation is to be executed to compute the sparse codes.

Example 11 may include the apparatus of example 8, wherein the one or more matrix-vector multiplication operations are to be replaced with a convolutional filter computation that is a function of a constant and a sub-region of a vector.

Example 12 may include the apparatus of any one of examples 7 to 11, further comprising a replacer to replace the one or more matrix-vector multiplication operations by an equivalent number of addition or subtraction operations.

Example 13 may include a method of operating an operation replacement apparatus, comprising determining a similarity between two unit vectors based on one or more matrix-vector multiplication operations executed on the two unit vectors, and replacing the one or more matrix-vector multiplication operations executed on the two unit vectors with an approximation computation.

Example 14 may include the method of example 13, wherein the one or more matrix-vector multiplication operations executed on the two unit vectors are to be replaced with the approximation computation in the sparse code applications and the neural network applications.

Example 15 may include the method of example 14, wherein the approximation computation is to use a set of basis vectors as an input, and output one or more of a best-matching neuron of the neural network applications or a dictionary atom for the sparse code application that best corresponds to the input basis vectors.

Example 16 may include the method of example 15, wherein a matching pursuit (MP) orthogonal matching pursuit (OMP) computation is to be executed to compute the sparse codes.

Example 17 may include the method of example 14, wherein the one or more matrix-vector multiplication operations are to be replaced with a convolutional filter computation that is a function of a constant and a sub-region of a vector.

Example 18 may include the method of any one of examples 13 to 17, wherein the one or more matrix-vector multiplication operations are to be replaced by an equivalent number of addition or subtraction operations.

Example 19 may include at least one computer readable storage medium comprising a set of instructions, which when executed by an apparatus, cause the apparatus to execute a command from a controller and control a scanner to scan an external image, extract sparse codes from the scanned external image, determine a similarity between two unit vectors from the scanned external image based on one or more matrix-vector multiplication operations executed on the two unit vectors, and replace the one or more matrix-vector multiplication operations executed on the two unit vectors with an approximation computation.

Example 20 may include the at least one computer readable storage medium of example 19, wherein the instructions, when executed, cause the apparatus to replace the one or more matrix-vector multiplication operations executed on the two unit vectors with the approximation computation in sparse code applications and neural network applications.

Example 21 may include the at least one computer readable storage medium of example 20, wherein the approximation computation uses a set of basis vectors as an input, and outputs one or more of a best-matching neuron of the neural network applications or a dictionary atom for the sparse code application that best corresponds to the input basis vectors.

Example 22 may include the at least one computer readable storage medium of example 21, wherein a matching pursuit (MP) orthogonal matching pursuit (OMP) computation is to be executed to compute the sparse codes.

Example 23 may include the at least one computer readable storage medium of example 20, wherein the one or more matrix-vector multiplication operations are to be replaced with a convolutional filter computation that is a function of a constant and a sub-region of a vector.

Example 24 may include the at least one computer readable storage medium of any one of examples 19 to 23, wherein the one or more matrix-vector multiplication operations are replaced by an equivalent number of addition or subtraction operations.

Example 25 may include an operation replacement apparatus comprising means for determining a similarity between two unit vectors based on one or more matrix-vector multiplication operations executed on the two unit vectors, and means for replacing the one or more matrix-vector multiplication operations executed on the two unit vectors with an approximation computation.

Example 26 may include the apparatus of example 25, wherein the one or more matrix-vector multiplication operations executed on the two unit vectors are to be replaced with the approximation computation in the sparse code applications and the neural network applications.

Example 27 may include the apparatus of example 26, wherein the approximation computation is to use a set of basis vectors as an input, and output one or more of a best-matching neuron of the neural network applications or a dictionary atom for the sparse code application that best corresponds to the input basis vectors.

Example 28 may include the apparatus of example 27, wherein a matching pursuit (MP) orthogonal matching pursuit (OMP) computation is to be executed to compute the sparse codes.

Example 29 may include the apparatus of example 26, wherein the one or more matrix-vector multiplication operations are to be replaced with a convolutional filter computation that is a function of a constant and a sub-region of a vector.

Example 30 may include the apparatus of any one of examples 25 to 29, wherein the one or more matrix-vector multiplication operations are to be replaced by an equivalent number of addition or subtraction operations.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
determining a similarity between two unit vectors based on one or more matrix-vector multiplication operations executed on the two unit vectors; and
replacing the one or more matrix-vector multiplication operations executed on the two unit vectors with a multiplication-free approximation computation.

2. The method of claim 1, wherein the one or more matrix-vector multiplication operations executed on the two unit vectors are to be replaced with the approximation computation in sparse code applications and neural network applications.

3. The method of claim 2, wherein the approximation computation is to use a set of basis vectors as an input, and output one or more of a best-matching neuron of the neural network applications or a dictionary atom for the sparse code application that best corresponds to the input basis vectors.

4. The method of claim 3, wherein a matching pursuit (MP) orthogonal matching pursuit (OMP) computation is to be executed to compute the sparse codes.

5. The method of claim 2, wherein the one or more matrix-vector multiplication operations are to be replaced with a convolutional filter computation that is a function of a constant and a sub-region of a vector.

6. The method of claim 1, wherein the one or more matrix-vector multiplication operations are to be replaced by an equivalent number of addition or subtraction operations.

* * * * *